US008378978B2

(12) United States Patent
Lee

(10) Patent No.: US 8,378,978 B2
(45) Date of Patent: Feb. 19, 2013

(54) INPUT/OUTPUT APPARATUS

(75) Inventor: Ming-Chang Lee, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 1136 days.

(21) Appl. No.: 12/178,654

(22) Filed: Jul. 24, 2008

(65) Prior Publication Data
US 2009/0295740 A1 Dec. 3, 2009

(30) Foreign Application Priority Data

May 30, 2008 (CN) .......................... 2008 1 0301852

(51) Int. Cl.
*G06F 3/41* (2006.01)
(52) U.S. Cl. ........................................ 345/173; 345/178
(58) Field of Classification Search ............ 345/89–102, 345/440, 520, 690–698, 156, 204–213; 348/252, 348/36, 37; 257/43, 57, 59, 79; 349/38, 349/39, 49, 108, 129, 149; 358/1.13; 340/679
See application file for complete search history.

(56) References Cited

U.S. PATENT DOCUMENTS

| | | | | |
|---|---|---|---|---|
| 4,785,295 A * | 11/1988 | Fukui et al. ................... 340/679 |
| 5,297,353 A * | 3/1994 | Ghalayini ........................ 40/503 |
| 6,594,930 B1 * | 7/2003 | Segan et al. ..................... 40/503 |
| 7,173,614 B2 * | 2/2007 | Morita ........................... 345/211 |
| 7,245,483 B2 * | 7/2007 | Feague et al. ............... 361/679.3 |
| 7,408,698 B2 | 8/2008 | Kuo et al. |
| 7,446,745 B2 * | 11/2008 | Morita ............................. 345/92 |
| 7,654,899 B2 * | 2/2010 | Durham et al. ................. 463/30 |
| 7,856,883 B2 * | 12/2010 | Chang et al. .................... 73/627 |
| 7,880,718 B2 * | 2/2011 | Cradick et al. ................ 345/156 |
| 8,097,926 B2 * | 1/2012 | De Graff et al. .............. 257/419 |
| 2003/0132924 A1 * | 7/2003 | Hamilton ....................... 345/204 |
| 2004/0267340 A1 * | 12/2004 | Cioanta et al. ................ 607/105 |
| 2005/0013194 A1 * | 1/2005 | Vaage et al. ................... 367/24 |
| 2005/0052890 A1 * | 3/2005 | Morita ............................ 365/87 |
| 2005/0078078 A1 * | 4/2005 | Morita .......................... 345/100 |
| 2005/0161501 A1 * | 7/2005 | Giering et al. ................. 235/379 |
| 2005/0274946 A1 * | 12/2005 | Yoshida et al. ................. 257/40 |
| 2006/0205364 A1 * | 9/2006 | Chen ........................... 455/90.3 |
| 2007/0057935 A1 * | 3/2007 | Takagi .......................... 345/211 |
| 2007/0242033 A1 * | 10/2007 | Cradick et al. ................ 345/156 |
| 2007/0285347 A1 * | 12/2007 | Karaki ............................ 345/30 |
| 2007/0285361 A1 * | 12/2007 | Jovanovich ..................... 345/87 |
| 2008/0007617 A1 * | 1/2008 | Ritchey ........................... 348/37 |

(Continued)

FOREIGN PATENT DOCUMENTS

| | | |
|---|---|---|
| CN | 1909608 A | 2/2007 |
| CN | 200997237 Y | 12/2007 |
| JP | 2004-081826 * | 3/2004 |
| JP | 2004-081826 A * | 3/2004 |
| TW | M293469 | 7/2006 |
| TW | M310415 | 4/2007 |
| TW | 200719235 A | 5/2007 |
| WO | WO 2007144549 A1 * | 12/2007 |

*Primary Examiner* — Prabodh M Dharia
(74) *Attorney, Agent, or Firm* — Altis Law Group, Inc.

(57) ABSTRACT

An input/output apparatus includes a main body and a display. The main body includes a power supply, a driver and a controller connected to the power supply. The driver is used for sending drive signals. The display module is fixed to the main body and connected to the power supply. The display module is driven by the driver to display information. The display module includes a display and a sensor. The display is used for displaying information according to the drive signals. The display is E-paper type. The sensor is attached to the display, and is capable of sensing external operations and generating corresponding sensor signals. The controller is connected to the sensor and used for receiving the sensor signals and controlling the sensor.

12 Claims, 7 Drawing Sheets

U.S. PATENT DOCUMENTS

| | | | |
|---|---|---|---|
| 2008/0012839 A1* | 1/2008 | Feague et al. | 345/179 |
| 2008/0030573 A1* | 2/2008 | Ritchey | 348/36 |
| 2008/0044209 A1* | 2/2008 | Nakanishi | 399/380 |
| 2008/0137122 A1* | 6/2008 | Eguchi et al. | 358/1.13 |
| 2008/0158217 A1* | 7/2008 | Hata et al. | 345/211 |
| 2008/0165130 A1* | 7/2008 | Chen | 345/163 |
| 2008/0238894 A1* | 10/2008 | Ng et al. | 345/204 |
| 2008/0278462 A1* | 11/2008 | Chang | 345/179 |
| 2008/0284710 A1* | 11/2008 | Kimura et al. | 345/98 |
| 2008/0284934 A1* | 11/2008 | Umezaki et al. | 349/43 |
| 2009/0113775 A1* | 5/2009 | Netter | 40/591 |
| 2009/0235750 A1* | 9/2009 | Chang et al. | 73/627 |

\* cited by examiner

INPUT/OUTPUT APPARATUS

BACKGROUND

1. Field of the Invention

The present invention generally relates to input/output apparatuses, and particularly, to an input/output apparatus for an electronic system.

2. Description of Related Art

With the advancement of touch screen technology, more and more electronic systems have touch screens to allow users to interact with the system more intuitively. Touch screens include cathode ray tube (CRT) displays and liquid crystal displays (LCD) with touch sensors laid thereon for sensing users' operations. However, the touch screens are generally thick and so take up a lot of space.

Another popular interactive apparatus is electronic paper (E-paper), which can be folded or rolled like ordinary paper, thus enhancing portability of devices using E-paper. However, conventional E-paper cannot sense users' operations, electronic systems incorporating E-paper as displays require additional input devices, such as keyboards or touch panels. Furthermore, for prolonging the working time of the E-paper, the electronic systems must be equipped with batteries that have large capacities. Unfortunately, batteries having large capacities are big and heavy, which impacts portability of the electronic systems.

DETAILED DESCRIPTION

Figure 1:
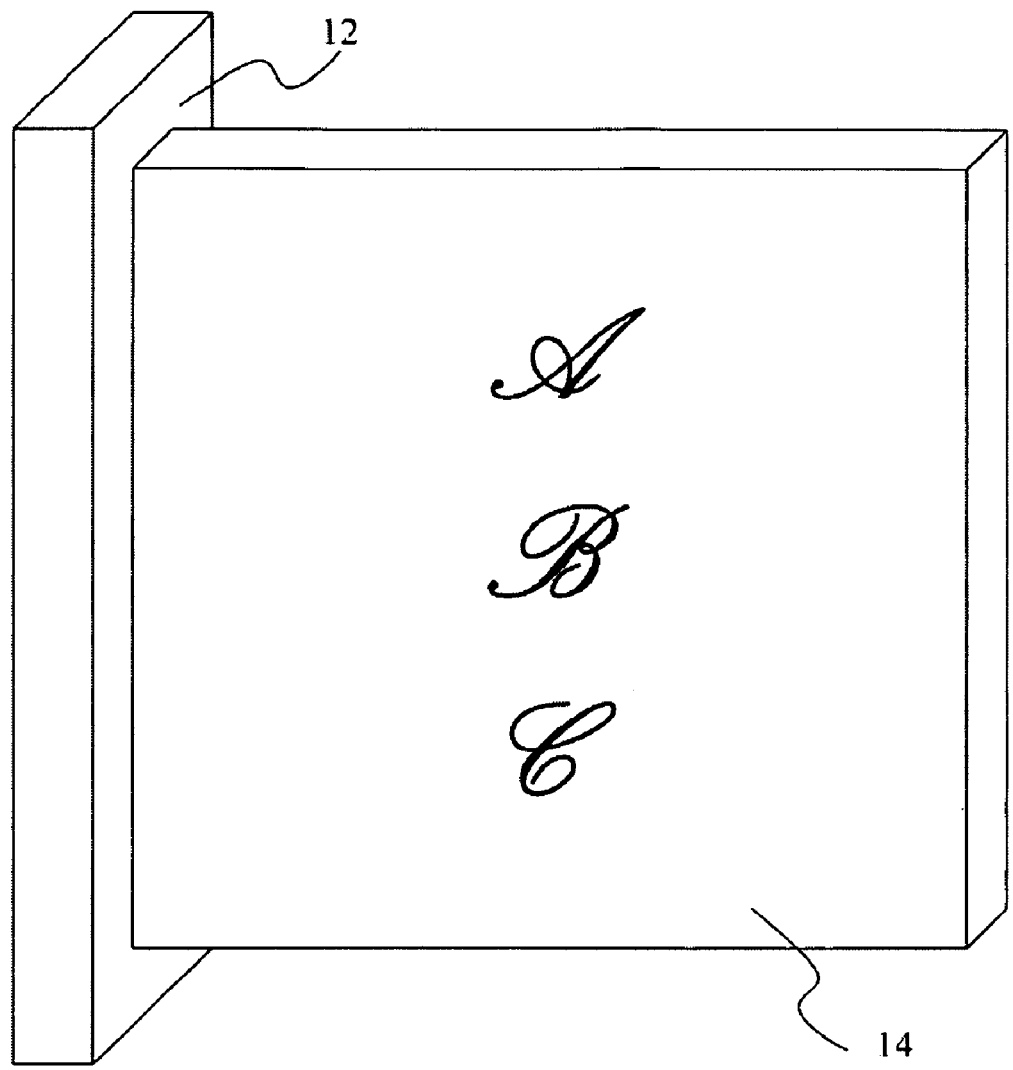
FIG. 1 is an isometric view of an input/output apparatus in accordance with an exemplary embodiment; the input/output apparatus includes a main body and a display.

Referring to FIG. 1, an input/output apparatus in accordance with an exemplary embodiment includes a main body 12 and a display module 14. The display module 14 is fixed to the main body 12, and is able to be disassembled from the main body 12. The main body 12 controls the display module 14 to display information, such as text, images, or video. The display module 14 is able to be folded or rolled for saving space, and is capable of sensing user operations thereon and generating corresponding operation signals according to the received user operations.

Figure 2:
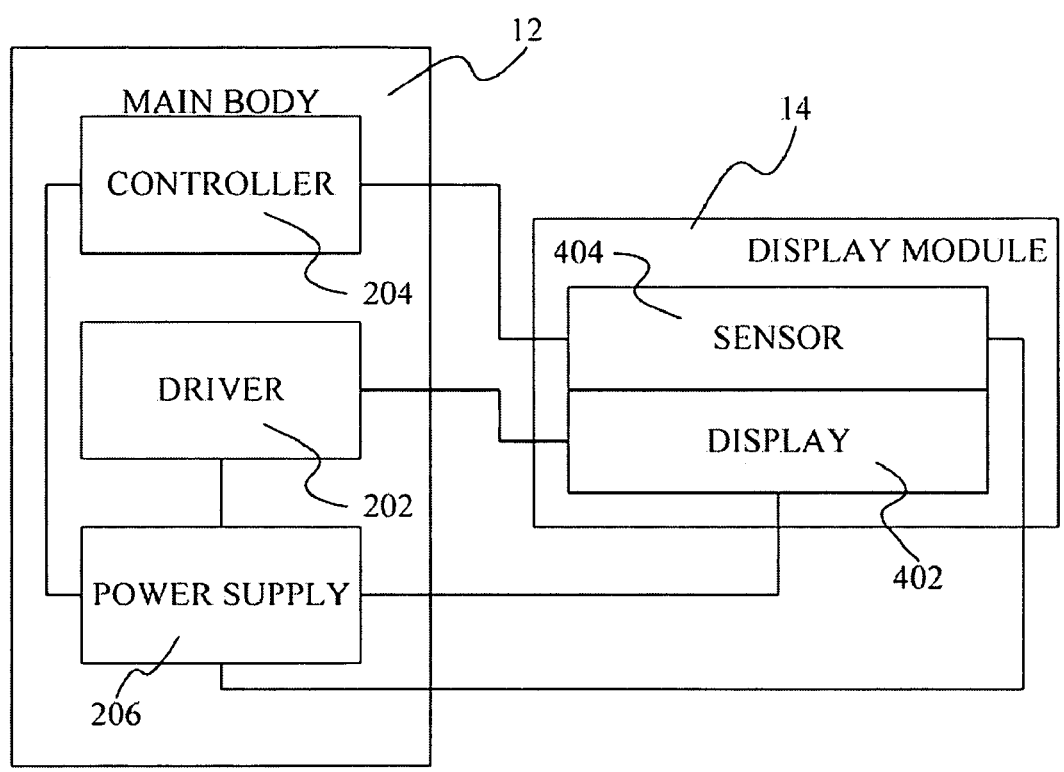
FIG. 2 is a block diagram of the input/output apparatus of FIG. 1

Referring to FIG. 2, the main body 12 includes a driver 202, a controller 204, and a power supply 206 connected to the driver 202 and the controller 204. The display module 14 includes a display 402 and a sensor 404 attached to the display 402.

The driver 202 is connected to the display 402, for sending drive signals to the display 402. The display 402 thus displays corresponding information, such as text, images, or video according to the drive signals.

The controller 204 is connected to the sensor 404, for controlling the sensor 404 and receiving sensor signals generated by the sensor 404. The controller 204 is further used for turning on or turning off the sensor 404, and adjusting the sensibility of the sensor 404.

The power supply 206 is used for powering the driver 202 and the controller 204. The power supply 206 can be a solar battery or any other photovoltaic device, which is lightweight and therefore conveniently portable. Furthermore, the photovoltaic device does not need to be charged, since it uses light as its power source.

The display 402 of the display module 14 is used for displaying information to users according to the drive signals sent from the driver 202. In this embodiment, the display 402 is an E-paper type display, which can be folded or rolled. The display 402 can be any of known E-paper using technologies like electrophoretic, electro-wetting, bistable LCD, cholesteric LCD, organic transistors, micro electromechanical system (MEMS), et al.

The sensor 404 of the display module 14 is attached to the display 402, and is capable of receiving user operations and generating corresponding sensor signals. The sensor 404 can be a surface acoustic wave sensor, infrared sensor, et al.

Figure 3:
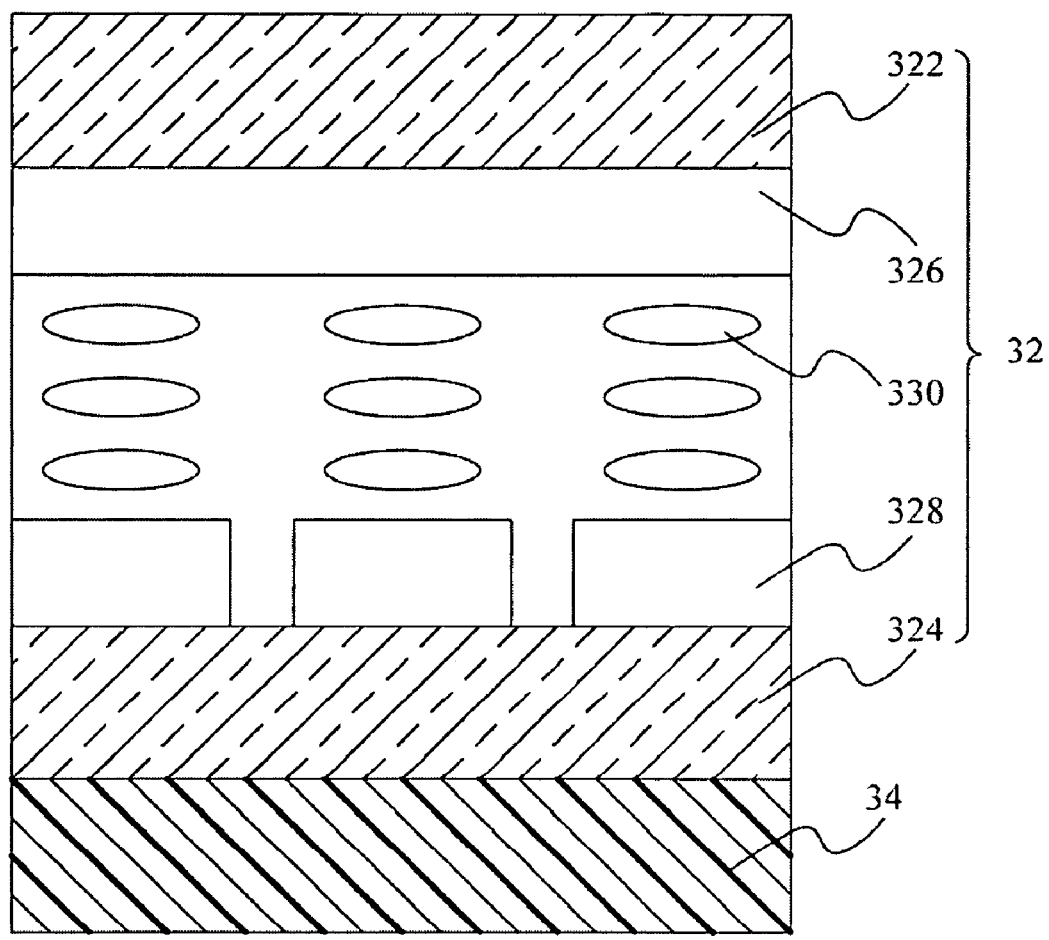
FIG. 3 shows layer structure of the display of FIG. 1 in accordance with a first exemplary embodiment.
Figure 4:
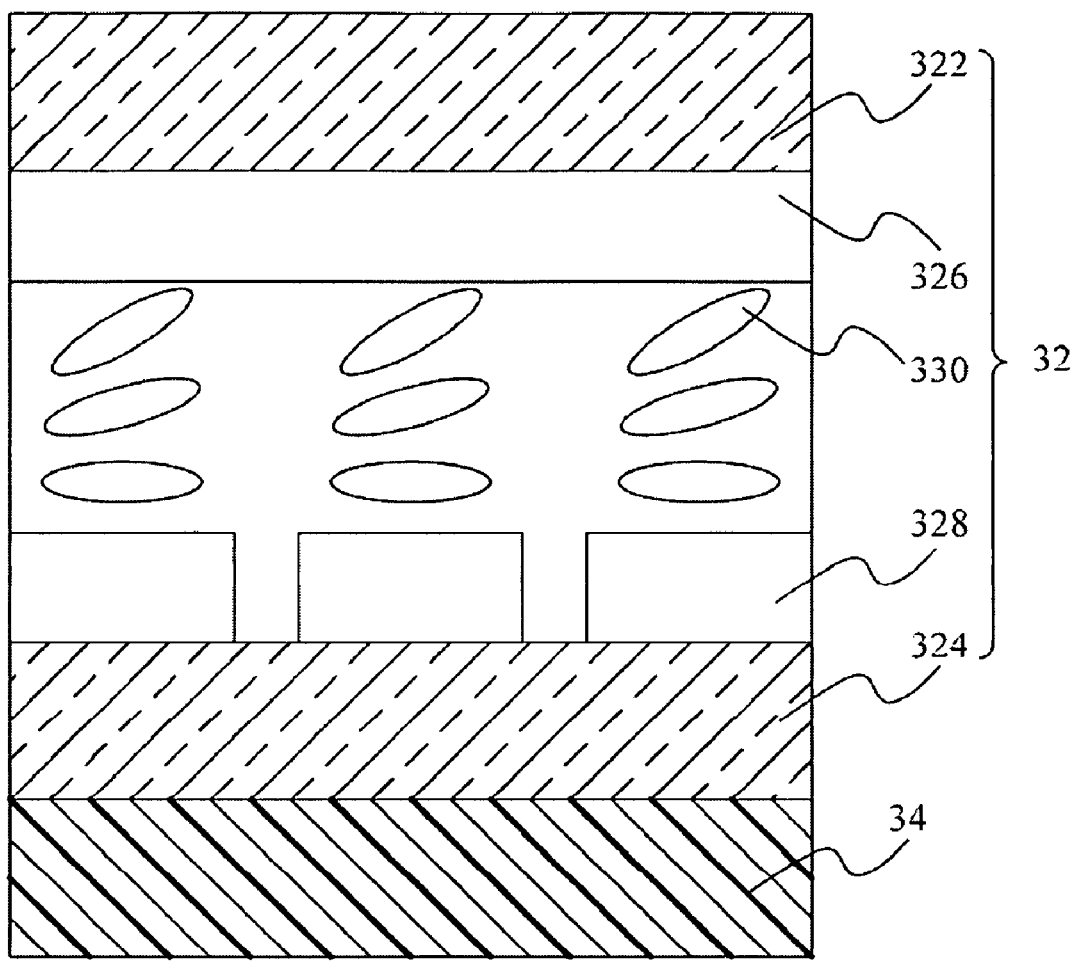
FIG. 4 is similar to FIG. 3, but showing the display in use.

Referring to FIGS. 3 and 4, an LCD type E-paper includes a display layer 32 and a backlight layer 34. The display layer 32 selectively allows the light emitted from the backlight layer 34 to pass through according to the drive signals sent from the driver 202. The display layer 32 includes two flexible films 322, 324, a plurality of row electrodes 326, a plurality of column electrodes 328, and liquid crystal 330. The flexible films 322, 324 are made of transparent materials for allowing light to pass through. The row electrodes 326 are attached to a side of the flexible film 322, facing the flexible film 324. The column electrodes 328 are attached to a side of the flexible films 324, facing the flexible film 322. The row electrodes 326 are perpendicular to the column electrodes 328. The liquid crystal 330 is disposed between the row electrodes 326 and the column electrodes 328. When there is no voltage applied on the row electrodes 326 or the column electrodes 328, molecules in the liquid crystal 330 block the light from the backlight layer 34 to pass through.

When particular voltages are applied to selected row electrodes 326 and corresponding column electrodes 328, the molecules in the liquid crystal 330 between the selected row electrodes 326 and the column electrodes 328 are guided to deflect, therefore allowing the light from the backlight layer 34 to pass through.

Figure 5:
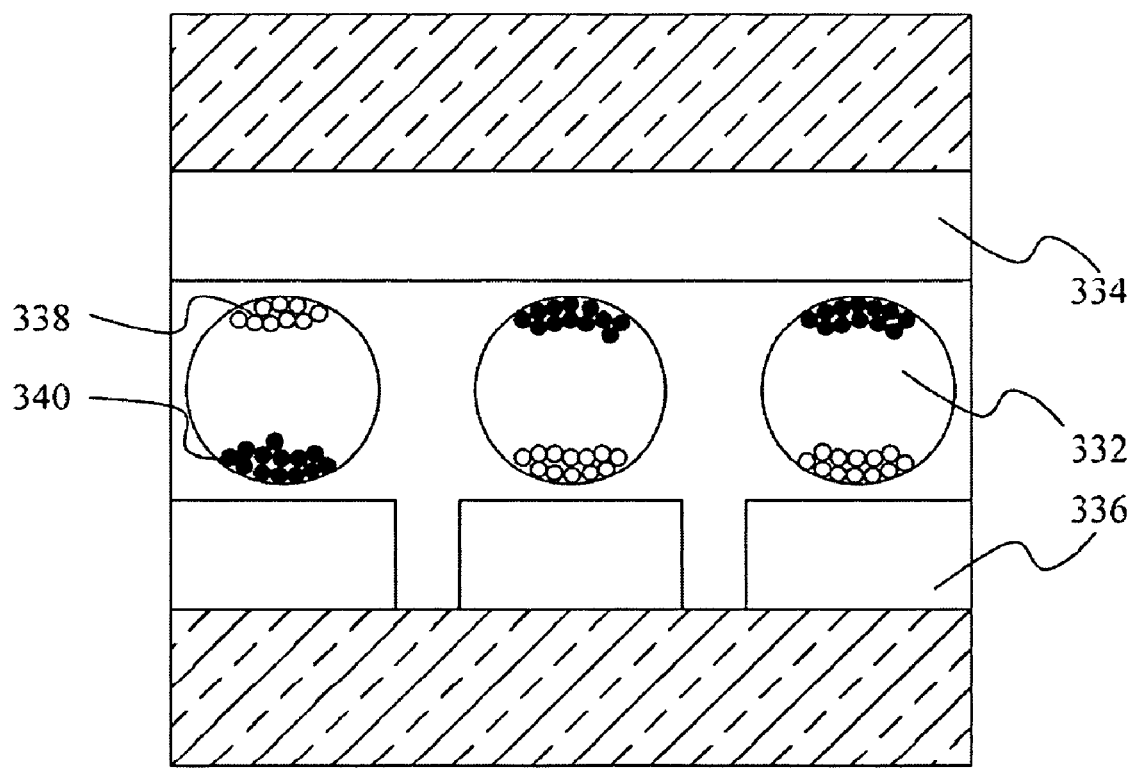
FIG. 5 is a schematic diagram of the display of FIG. 1 in accordance with a second exemplary embodiment.

Referring to FIG. 5, an electrophoretic type E-paper includes a plurality of spheres 332 arranged between row electrodes 334 and column electrodes 336 that are attached to flexible films (not labeled). Each sphere 332 has two kinds of particulates 338, 340 therein. The particulates 338, 340 have contrasting colors. When particular voltages are applied to the row electrodes 334 and column electrodes 336, particulates 338, 340 in the spheres 332 between the selected row electrodes 334 and column electrodes 336 are driven to adhere to opposite sides towards the two flexible films to form an image cooperatively.

Figure 6:
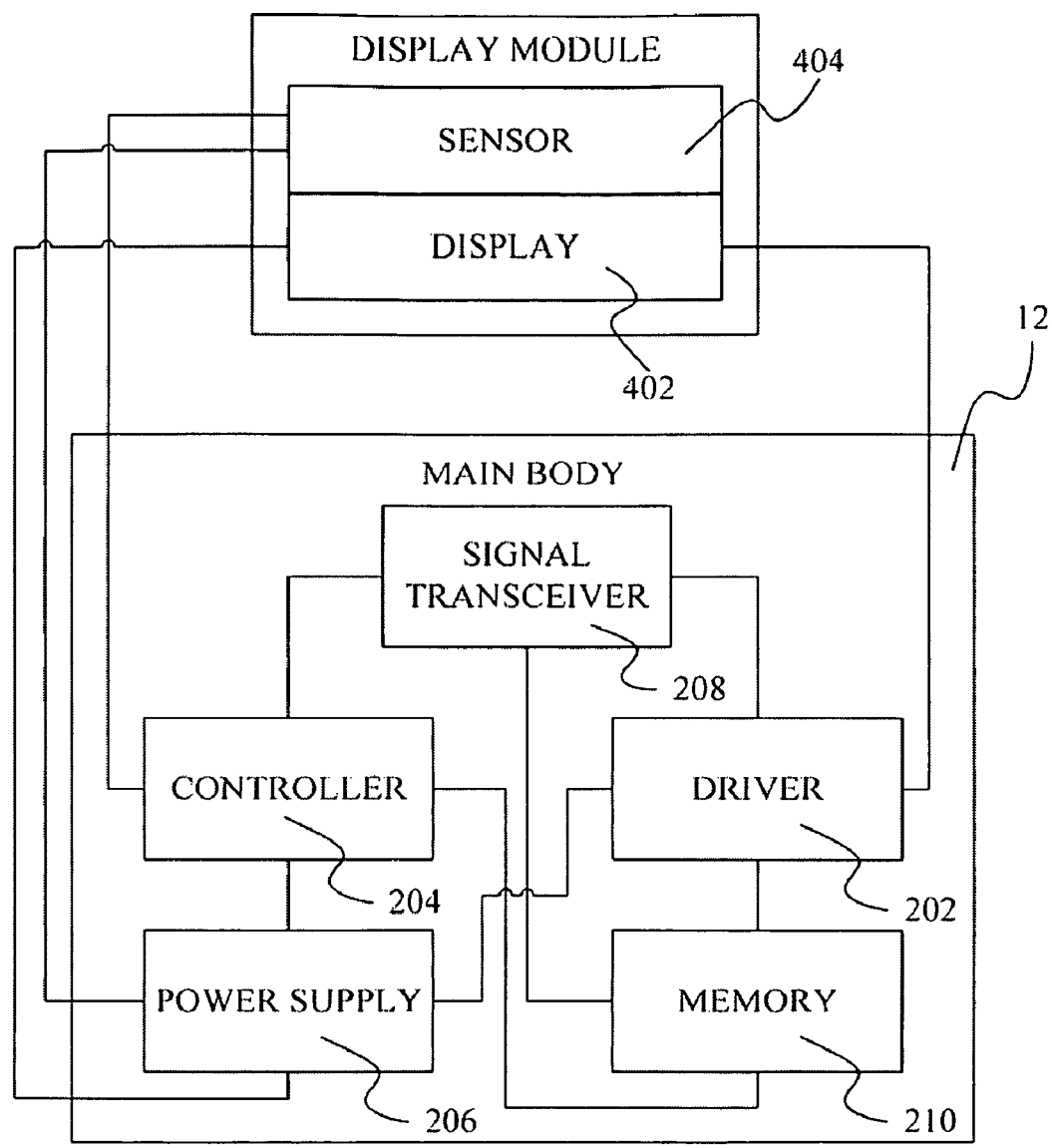
FIG. 6 is a block diagram of the input/output apparatus in accordance with another exemplary embodiment.

Referring to FIG. 6, the main body 12 according to another exemplary embodiment is similar to the main body as shown in FIG. 2. However, the main body 12 of this embodiment further includes a signal transceiver 208, and a memory 210.

The signal transceiver 208 is connected to the driver 202 and the controller 204, for receiving signals from external devices, and transmitting signals. For example, the signal transceiver 208 receives information signals from external signal sources, such as a graphic card of a computer, and transmits the information signals to the driver 202. The driver 202 generates corresponding drive signals according to the information signals, to drive the display 402 to work. As another example, the signal transceiver 208 can also be used for receiving control signals from external devices for controlling or adjusting the present input/output apparatus. The signal transceiver 208 can also be used for transmitting sensor signals received by the controller 204 from the sensor 404. The signal transceiver 208 can be any known means for receiving or sending the signals, like USB ports, IEEE 1394 ports, infrared, or Bluetooth, et al.

The memory 210 is connected to the driver 202, the controller 204, and the signal transceiver 208, for storing corresponding information that is processed by the driver 202, the controller 204, and the transceiver 208. For example, the memory 210 stores the information signals received by the signal transceiver 208, for being read by the driver 202. As another example, the memory 210 stores the sensor signals received by the controller 204, for being read by the signal transceiver 208, the signal transceiver 208 therefore sends the sensor signal after reading out the sensor signal. The memory 210 can either be fixed in the present input/output apparatus or be pluggable. The present input/output apparatus can have an interconnection port installed therein, such as a card slot or a data port, for allowing the pluggable memory 210 to plug thereto.

Figure 7:
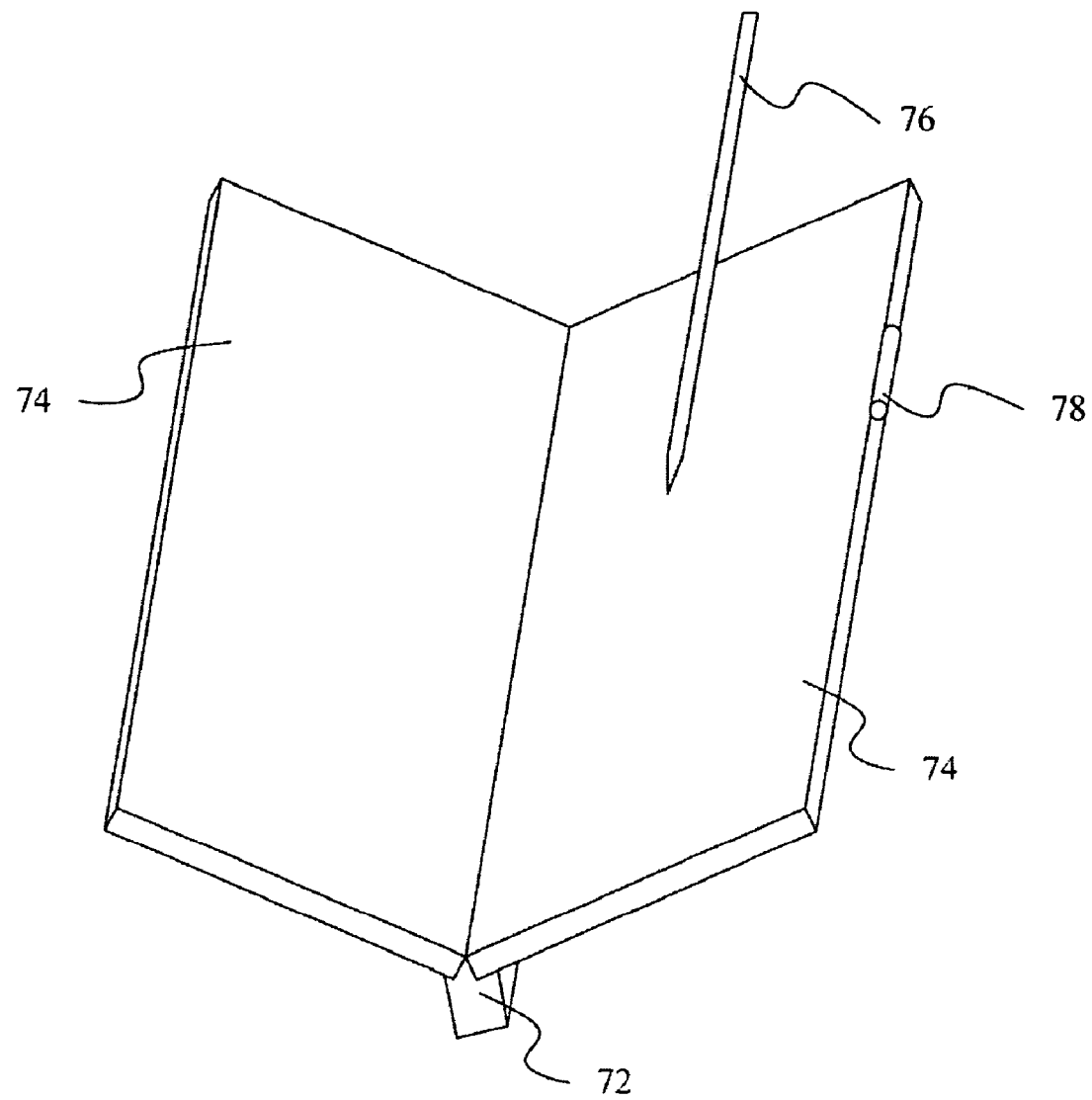
FIG. 7 is an isometric view of an input/output apparatus in accordance with another exemplary embodiment.

Referring to FIG. 7, an input/output apparatus according to another exemplary embodiment includes a main body 72, two display modules 74, a pen 76, and a sleeve 78. The display modules 74 are rotationally fixed to the main body 72 through a shaft (not shown), and are able to be folded. The display modules 74 are E-paper types, capable of being folded or rolled. Either one of the display modules 74 includes a sensor for sensing user operations, or both of the display modules 74 respectively include a sensor for sensing user operations. The pen 76 is used for touching the display module 74, and the touch action is thus sensed by the sensor therein. Therefore users need not operate the display module 74 directly using their own fingers. The sleeve 78 is fixed to a side of a display module 74, for receiving the pen 76.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An input/output apparatus comprising:
   a main body comprising:
      a power supply for providing electric power;
      a driver capable of generating drive signals, the driver being connected to the power supply; and
      a controller connected to the power supply;
   a display module fixed to the main body and connected to the power supply, the display module being driven by the driver to display information, the display module comprising:
      a display for displaying information according to the drive signals, the display being E-paper type; and
      a sensor attached to the display, the sensor being capable of sensing external operations and generating corresponding sensor signals; and
   another display module comprising a display of E-paper type, wherein the display modules are substantially have a same size and rotationally fixed to the main body, the display modules are selectively configured to overlap by rotating with respect to the main body, the displays of the display modules face each other when the display modules overlap;
   wherein the controller is connected to the sensor and configured for receiving the sensor signals and automatically controlling the sensor to adjust the on/off status and/or the sensitivity of the sensor.

2. The input/output apparatus as described in claim 1, wherein the power supply is a photovoltaic device.

3. The input/output apparatus as described in claim 1, wherein the main body further comprises a signal transceiver connected to the controller and the driver, for receiving external signals and sending the sensor signals.

4. The input/output apparatus as described in claim 3, wherein the signal transceiver is capable of transmitting the external signals to the driver, the driver generates the drive signals according to the external signals.

5. The input/output apparatus as described in claim 3, wherein the main body further comprises a memory connected to the signal transceiver, for storing the external signals.

6. The input/output apparatus as described in claim 5, wherein the memory is connected to the controller for storing the sensor signals that the controller receives from the sensor.

7. The input/output apparatus as described in claim 3, wherein the main body further comprises a pluggable memory and a card slot, the pluggable memory is selectively connected to the signal transceiver for storing the external signals, the card slot is for receiving the pluggable memory.

8. The input/output apparatus as described in claim 7, wherein the pluggable memory is selectively connected to the controller for storing the sensor signals that the controller receives from the sensor.

9. The input/output apparatus as described in claim 1, further comprising a pen, wherein the external operations are made by the pen via the sensor.

10. The input/output apparatus as described in claim 9, further comprising a sleeve member fixed to a side of the display module, wherein the sleeve member is configured for receiving the pen.

11. The input/output apparatus as described in claim 1, wherein the sensor is one selected from the group consisting of surface acoustic wave sensor and infrared sensor.

12. The input/output apparatus as described in claim 1, wherein the E-paper type is one selected from the group consisting of electrophoretic, electro-wetting, bistable liquid crystal display, cholesteric liquid crystal display, organic transistors and micro electromechanical.

* * * * *